US008400981B1

United States Patent
Hobson et al.

(10) Patent No.: US 8,400,981 B1
(45) Date of Patent: Mar. 19, 2013

(54) METHOD AND SYSTEM FOR PROVIDING REGISTRATION COVERAGE IN A TELECOMMUNICATIONS NETWORK

(75) Inventors: Michael R. Hobson, Sterling, VA (US);
Bryan Achziger, Aurora, CO (US);
Todd D. Fleming, Rensselaer, NY (US);
Edward Nichols, Tustin, CA (US);
Patricia V. Wright, Tampa, FL (US)

(73) Assignee: Nextel Communications Inc., Reston, VA (US)

( * ) Notice: Subject to any disclaimer, the term of this patent is extended or adjusted under 35 U.S.C. 154(b) by 719 days.

(21) Appl. No.: 12/496,337

(22) Filed: Jul. 1, 2009

(51) Int. Cl.
*H04W 4/00* (2009.01)
(52) U.S. Cl. .......................................................... 370/331
(58) Field of Classification Search .................. 370/331, 370/319, 321, 344, 437, 441, 442, 464, 465, 370/480, 491, 492, 495; 455/456.1, 436, 455/432.1, 435.1, 456.3, 517
See application file for complete search history.

(56) References Cited

U.S. PATENT DOCUMENTS

| | | | | |
|---|---|---|---|---|
| 5,613,204 | A * | 3/1997 | Haberman et al. | 455/432.3 |
| 7,113,793 | B2 * | 9/2006 | Veerasamy et al. | 455/456.1 |
| 7,920,876 | B2 * | 4/2011 | Rahman | 455/456.1 |
| 8,055,270 | B1 * | 11/2011 | Copeland et al. | 455/456.1 |

* cited by examiner

*Primary Examiner* — Chi Pham
*Assistant Examiner* — Alexander O Boakye

(57) ABSTRACT

A method and system for providing registration coverage in a telecommunications network is disclosed. In accordance with an embodiment of the method, the method includes determining a registration coverage hole in the telecommunications network, providing a single pilot site in proximity to the registration coverage hole, and broadcasting a single registration channel in a 360 degree pattern by the single pilot site. In accordance with an embodiment of the system of the present invention, the system includes the single pilot site in proximity to the registration coverage hole, where the single pilot site broadcasts the single registration channel in a 360 degree pattern.

18 Claims, 1 Drawing Sheet

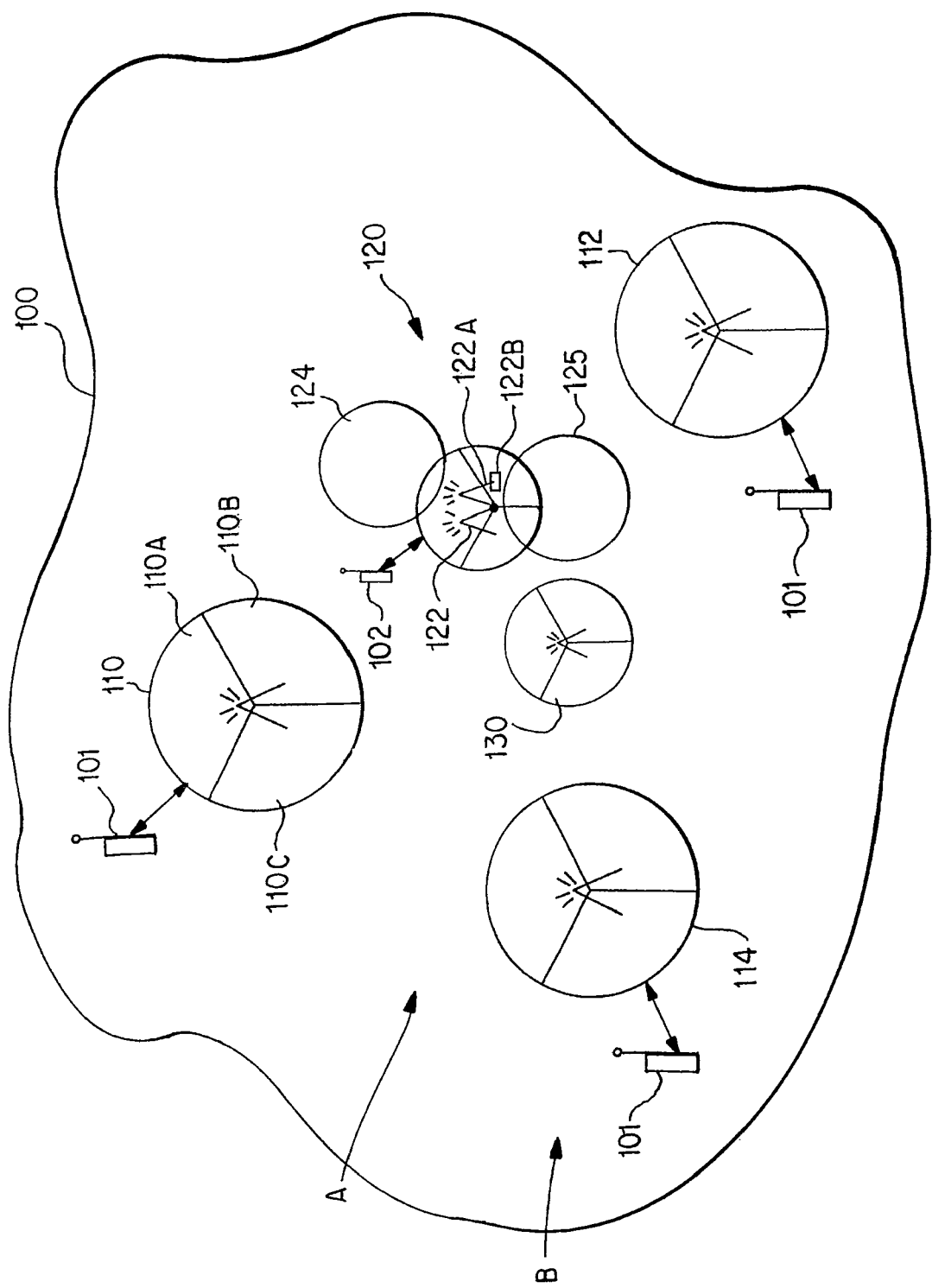

METHOD AND SYSTEM FOR PROVIDING REGISTRATION COVERAGE IN A TELECOMMUNICATIONS NETWORK

FIELD OF THE INVENTION

The present invention relates generally to the field of telecommunications, and in particular to providing registration coverage in a telecommunications network.

BACKGROUND OF THE INVENTION

Current methods of band map channel frequency planning and allocation is to allocate a band map channel on every sector of every site in a telecommunications network.

In cases where the pool of band map channels available for allocation has decreased from a historical value to a small fraction of the historical value, e.g., from 40 band map channels down to only 9 band map channels in the case of a particular geographic region, it becomes necessary to provide a new method and system for allocating the band map channels.

Therefore, there is a need for an improved method and system for providing registration coverage in a telecommunications network.

SUMMARY OF THE INVENTION

A method and system for providing registration coverage in a telecommunications network is provided. In accordance with an embodiment of the method, the method includes determining a registration coverage hole in the telecommunications network, providing a single pilot site in proximity to the registration coverage hole, and broadcasting a single registration channel in a 360 degree pattern by the single pilot site.

In accordance with an embodiment of the system of the present invention, the system includes the single pilot site in proximity to the registration coverage hole, wherein the single pilot site broadcasts the single registration channel in a 360 degree pattern.

BRIEF DESCRIPTION OF THE DRAWING

The FIGURE illustrates a telecommunications network that utilizes a pilot site in accordance with the principles of the present invention.

DETAILED DESCRIPTION OF THE EXEMPLARY EMBODIMENTS

In the present invention, particularly in cases where the pool of band map channels available for allocation has decreased from a historical value to a small fraction of the historical value, e.g., from 40 band map channels down to only 9 band map channels in the case of a particular geographic region, it becomes necessary to provide a new method and system for allocating the band map channels. In the present invention, instead of allocating every single sector of the telecommunications network with a band map channel, a pilot site is provided.

As will be further explained below, the pilot site utilizes a single strategically located site in close proximity to, or inside of, a coverage hole in the band map coverage footprint for the geographic region. This strategically positioned pilot site fills the coverage hole by broadcasting a single band map channel in a 360 degree (quasi-omnidirectional) pattern. This pilot site with the single band map channel in the 360 degree pattern fills the band map coverage hole in the band map coverage footprint for the geographic region without requiring the allocation of three separate band map channels to that site or to multiple sites in the local area of the band map coverage hole.

Thus, the pilot site provides band map channel coverage in a coverage hole with a lesser number of band map channels than would otherwise be required if every single sector of the site was allocated with a band map channel. As such, band map channels can be more efficiently allocated, particularly in an area where the available pool of band map channels is limited.

The FIGURE illustrates a telecommunications network 100 that provides telecommunication services for subscribers of the network. As can be seen, network 100 includes sites 110, 112, and 114, each of which sites provides channels for communication with the mobile communication devices 101 of the subscribers of the network. Each of these sites will be referred to as full service sites since the sites not only provide for registration of the mobile devices 101 with the network 100, but additionally provide for all other communication services provided by the network, e.g., voice and data traffic, including both dispatch voice communications and interconnect communications. As is known, a dispatch voice communication is a half-duplex communication where only one party at a time is able to speak in the communication session. These calls are also generally referred to as a push-to-talk call. An interconnect call is a regular full-duplex telephone communication. Whereas network 100 is shown as including sites 110, 112, and 114, the present invention is not limited to this number of sites.

As full service sites, sites 110, 112, and 114 include band map (registration) channels as well as traffic channels (TCH), e.g., voice and data channels. The 360 degree coverage area of each site is divided into three segments and each segment includes a band map channel as well a traffic channel(s). Thus, to provide band map coverage in a geographic area serviced by a full service site, three band map channels are provided in a 360 degree coverage zone around that site. The three segments 110A, 110B, and 110C for site 110 are shown in the FIGURE. As can be understood, sites 112 and 114, and any other full service sites in network 100, also would include multiple segments, each with a discrete band map channel.

As can also be seen in the FIGURE, a registration coverage hole 120 results in the telecommunications network 100 from the lack of availability of band map channels. The registration coverage hole 120 is an area where band map channels are not allocated to a communication site(s) and is adjacent to sites 110, 112, and 114 where registration coverage is available by utilizing the multiple discrete band map channels allocated to the multiple sectors of the full service sites.

To provide band map coverage in the registration coverage hole 120, a pilot site 122A is provided which is co-located with communication site 122, which communication site 122 does not includes band map channels for each of its three sectors. The coverage area of pilot site 122A is commensurate with the coverage area of site 122, which is represented by the coverage circle drawn around the sites.

Pilot sites are strategically chosen sectored sites that have one branch of diversity taken from each sector of the co-located site, split into a quasi-omnidirectional configuration, and run through its own site controller to turn it into a separate site co-located with the initial sectored site running only one channel, a band map channel. The quasi-omnidirectional coverage pattern serves the most subscribers within the footprint of the site in instances where site density is too low for band map staggering to be effective, which will be discussed further below. A good candidate site for a co-located pilot site is a site that is centrally located among other densely packed sites that could go without band map channels if this site is turned into a pilot site with a quasi-omnidirectional propagation pattern. This would both eliminate the need for the closely located neighbors, i.e., first tier neighbors, 124, 125, which overlap in coverage to some degree with the pilot site, to have band map channels assigned and would provide a band map channel for the co-located site. This allows one band map channel to be used to register subscribers being served by the three separate sectors of the co-located site's coverage footprint, rather than using three band map channels, and also provides for the one band map channel to serve the neighbor sites as well in the densely packed sites.

As discussed above, the pilot site 122A only provides a single band map channel in a 360 degree area around pilot site 122A and does not provide any traffic channels. The band map (registration) channel only handles the registration of a mobile communications device 102 in the telecommunications network. After the mobile communications device 102 is registered in the pilot site 122A of the telecommunications network 100, the device 102 is handed off to the best serving neighbor sector. When handing off the mobile communications device 102 to the neighbor sector by the pilot site 122A, the pilot site 122A sheds voice traffic and reselect traffic to the neighbor sector.

As also discussed above, the single pilot site 122A, which fills the coverage hole 120 in the band map channel footprint A of the geographic region B, broadcasts the single registration channel in a 360 degree pattern. The single pilot site 122A broadcasts the single registration channel in the 360 degree pattern by taking one branch of diversity per sector from co-located site 122 and connecting them to a splitter 122B to achieve the quasi-omnidirectional propagation pattern.

In providing the pilot site, the uplink signal to the existing sectors of the co-located site will each lose a branch of diversity gain, which may impact subscriber service in outer fringes of the coverage area, and the pilot site itself will only have unity gain on the uplink, which may cause a degradation of service to those subscribers who are currently able to register in fringe coverage or certain in-building coverage scenarios. However, the providing of the pilot sites, as discussed above, will reduce the number of band map channels required in areas where there is a shortage of available band map channels.

The pilot site approach of the present invention can be used in conjunction with a band map staggering approach. Band map staggering allocates band map channels only on enough sectors in a band map staggering site in order to provide a predetermined level of band map channel coverage for a given percentage of the overall market coverage footprint. As such, band map staggering staggers the deployment of band map channels such that only the sectors that are needed to, for example, cover 90% of the market at −81 dBm will use them.

As can be seen in the FIGURE, the single pilot site 122A is adjacent to a band map staggering site 130. Thus, a coverage hole of band map channels due to a shortage of band map channels in a geographic area may be filled by both the pilot site 122A and the band map staggering site 130.

The use of pilot sites to supplement band map staggering for band map channel allocation can decrease the number of band map channels allocated in a geographic area where one particular pilot site could cover the same area with one channel in the quasi-omnidirectional pattern that several other sectors of different sites could otherwise cover with multiple discrete channel assignments.

With the present invention, the pilot site provides band map channel coverage in a coverage hole in the band map coverage footprint for the geographic region. The single pilot site, broadcasting the single band map channel, provides substitute coverage in the former coverage hole which otherwise would have required a separate band map channel in each of the three separate sectors of a site with a coverage footprint that would fill the coverage hole or would have required separate band map channels in several other sectors of different sites to fill the coverage hole. The net result of carefully chosen pilot site deployments is less channel assignments and a lower reuse factor in that localized area, lowering interference in the neighboring areas, and allowing for other band map channels to be used in the neighboring localities more closely to the area covered by the pilot site than would be possible if multiple discrete band map channels were allocated to multiple sectors of separate sites, or a to a single site, in the pilot site's coverage area rather than a single pilot site.

Thus, with the pilot site method and system of the present invention for providing registration coverage in a telecommunications network, strategically located sites are configured such that registration coverage is provided for a predetermined percentage of the market's coverage at a predetermined minimum level of coverage using the least number of band map channel frequency assignments. The use of pilot sites can be used in lieu of, or in combination with, band map staggering sites.

The present invention is not limited to any particular parameters for a band map channel. For example, the band map channel may be an 800 MHz or 900 MHz channel in an Integrated Digital Enhanced Network (iDEN) for providing dispatch (push-to-talk) voice communication services. However, as discussed above, the band map channel only provides for registration message traffic for a mobile communications device.

The disclosed embodiments are illustrative of the various ways in which the present invention may be practiced. Other embodiments can be implemented by those skilled in the art without departing from the spirit and scope of the present invention.

What is claimed is:

1. A method for providing registration coverage in a telecommunications network, comprising the steps of: determining a registration coverage hole in the telecommunications network, wherein the registration coverage hole is an area where no registration coverage is available and wherein the registration coverage hole is adjacent to sites where registration coverage is available by utilizing multiple discrete registration channels allocated to multiple sectors of the sites; providing a single pilot site in proximity to the registration coverage hole; and broadcasting a single registration channel in a 360 degree pattern by the single pilot site.

2. The method according to claim 1, wherein the registration channel only handles a registration of a mobile communications device in the telecommunications network.

3. The method according to claim 2, further comprising the step of handing off the mobile communications device to a neighbor sector by the single pilot site after the mobile communications device is registered in the telecommunications network.

4. The method according to claim 3, wherein the step of handing off the mobile communications device to the neighbor sector by the single pilot site includes shedding voice traffic and reselect traffic to the neighbor sector.

5. The method according to claim 1, wherein the step of broadcasting the single registration channel in the 360 degree pattern by the single pilot site includes the steps of taking one branch of diversity per sector of a co-located site and connecting them to a splitter to achieve a quasi-omnidirectional propagation pattern.

6. The method according to claim 1, wherein the single pilot site broadcasting the single registration channel provides coverage for three separate segments of a coverage footprint of a co-located site.

7. The method according to claim 6, wherein the three separate segments of the coverage footprint of the co-located site do not include a registration channel.

8. The method according to claim 1, wherein the single pilot site is adjacent to a band map staggering site.

9. The method according to claim 1 wherein a band map staggering site is disposed within the registration coverage hole.

10. A system for providing registration coverage in a telecommunications network, comprising: a single pilot site in proximity to a registration coverage hole in the telecommunications network, wherein the registration coverage hole is an area where no registration coverage is available and wherein the registration coverage hole is adjacent to sites where registration coverage is available by utilizing multiple discrete registration channels allocated to multiple sectors of the sites, wherein the single pilot site broadcasts a single registration channel in a 360 degree pattern.

11. The system according to claim 10, wherein the registration channel only handles a registration of a mobile communications device in the telecommunications network.

12. The system according to claim 11, wherein the single pilot site hands off the mobile communications device to a neighbor sector after the mobile communications device is registered in the telecommunications network.

13. The system according to claim 12, wherein the single pilot site sheds voice traffic and reselect traffic to the neighbor sector when the single pilot site hands off the mobile communications device to the neighbor sector.

14. The system according to claim 10, wherein the single registration channel in the 360 degree pattern is provided by connecting a branch of diversity per sector of a co-located site to a splitter to achieve a quasi-omnidirectional propagation pattern.

15. The system according to claim 10, wherein the single pilot site broadcasting the single registration channel provides coverage for three separate segments of a coverage footprint of a co-located site.

16. The system according to claim 15, wherein the three separate segments of the coverage footprint of the co-located site do not include a registration channel.

17. The system according to claim 10, wherein the single pilot site is adjacent to a band map staggering site.

18. The system according to claim 10, wherein a band map staggering site is disposed within the registration coverage hole.

* * * * *